United States Patent [19]
Hamsher

[11] 3,879,409

[45] Apr. 22, 1975

[54] ISOLATION OF 6-AMINOPENICILLANIC ACID AND SALTS THEREOF

[75] Inventor: James J. Hamsher, Pawcatuck, Conn.

[73] Assignee: Pfizer Inc., New York, N.Y.

[22] Filed: Feb. 23, 1973

[21] Appl. No.: 335,435

[52] U.S. Cl............. 260/306.7 C; 260/239.1
[51] Int. Cl............................. C07d 99/14
[58] Field of Search............. 260/239.1, 306.7 C

[56] References Cited
UNITED STATES PATENTS

| | | | |
|---|---|---|---|
| 3,221,008 | 11/1965 | Wolf et al................. | 260/239.1 |
| 3,238,252 | 3/1966 | Giacometti et al.......... | 260/239.1 |
| 3,574,225 | 4/1971 | Munden.................... | 260/239.1 |

*Primary Examiner*—Nicholas S. Rizzo
*Attorney, Agent, or Firm*—Connolly and Hutz

[57] ABSTRACT

6-Aminopenicillanic acid or salts thereof, obtained by chemical or enzymatic cleavage of benzyl- or phenoxymethylpenicillin, are isolated from the hydrolysis solution by extraction of the phenylacetic acid or phenoxyacetic acid followed by spray drying at a pH of 2–8, or, alternately, spray drying said solution at a pH of 2–8 followed by extraction of the phenylacetic acid or phenoxyacetic acid.

15 Claims, No Drawings

ISOLATION OF 6-AMINOPENICILLANIC ACID AND SALTS THEREOF

BACKGROUND OF THE INVENTION

This invention relates to a process for the isolation of a chemical compound from a reaction mixture and in particular to the isolation of 6-aminopenicillanic acid and salts thereof, compounds valuable as intermediates leading to other synthetic penicillins.

The compounds in the group belonging to the family of penicillins differ from each other in the nature of the R variable and possess the general formula indicated below

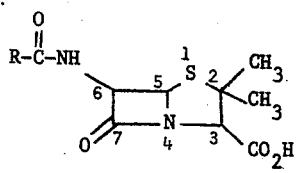

wherein the acyl moiety on the 6-aminopenicillanic acid is derived from a carboxylic acid. The most widely used natural penicillins are those wherein the R variable is represented by benzyl— (penicillin G) or phenoxymethyl— (penicillin V). While these well-known analogs are highly antagonistic toward gram-positive micro-organisms, they have limited gram-negative activity. Consequently, preparation of penicillins which will combat the rise in gram-negative infections has received considerable synthetic attention.

Synthesis of such penicillins containing an R variable other than those heretofore mentioned is effected through a condensation of an acid or derivative thereof with 6-aminopenicillanic acid or salt thereof, for example, as taught in U.S. Pat. No. 3,159,617. Such synthetic efforts require a ready source of the starting material, 6-aminopenicillanic acid, which is most conveniently obtained by chemical or enzymatic hydrolysis of a commercial penicillin made available as a fermentation product.

Chemical hydrolysis of penicillins, and in particular penicillin G and penicillin V, is taught in U.S. Pat. No. 3,499,909 wherein the 6-aminopenicillanic acid is isolated from the cooled reaction mixture as the amphoteric compound at pH 4. Direct formation of 6-aminopenicillanic acid through fermentation is taught in U.S. Pat. No. 3,164,604, where it is reportedly isolated from the concentrated fermentation liquor by initial adsorption on an ion exchange resin followed by elution with a suitable solvent. U.S. Pat. Nos. 3,144,395, 2,941,995, 3,260,653, 3,239,428, 3,121,667, 3,446,705, 3,127,326, 3,239,427 and 3,622,462 all describe the enzymatic cleavage of a penicillin, the 6-aminopenicillanic acid resulting therefrom being isolated by pH adjustment to the isoelectric point thereby inducing crystallization.

British Pat. No. 896,245 teaches isolation of 6-aminopenicillanic acid from an aqueous fermentation liquor by extracting at an acid pH employing alkanols and aliphatic ketones having from 4 to 10 carbon atoms, while U.S. Pat. No. 3,272,715 claims initial removal of the hydrolyzed side chain of a cleaved penicillin at a pH range of 1.5–3.0 followed by adjustment of the pH to 3.0–5.0 and concentration to induce crystallization.

SUMMARY OF THE INVENTION

It has now been discovered that in the process for isolating 6-aminopenicillanic acid, its sodium and potassium base salts or its hydrochloride acid addition salt from a hydrolysis solution containing the same at a concentration of 2–10 weight percent per unit volume and either phenylacetic acid or phenoxyacetic acid, which comprises the steps of spray drying said hydrolysis solution of 125°–275° C. while at pH 2–8 and extracting the phenylacetic acid or phenoxyacetic acid with an organic solvent it is not only possible to obtain excellent yields of 6-aminopenicillanic acid, but also allows for the direct isolation of various basic salts and acid addition salts thereof without the necessary for an additional costly conversion step of the 6-aminopenicillanic acid to the desired salt. Previously reported isolations of 6-aminopenicillanic acid employ procedures resulting in isolating the amphoteric material which must be converted to a basic salt prior to acylation in order to form a new penicillin.

The process of extracting, whereby the phenylacetic acid or phenoxyacetic acid side chains, resulting from the hydrolysis of penicillin G or V, is separated from the solid 6-aminopenicillanic acid or the 6-aminopenicillanic acid in an aqueous solution by selectively solublizing said acids in a solvent, is a procedure well known to those skilled in the art; the procedure of spray drying, although found less frequently in the chemical literature than extracting procedures, is also known to those skilled in the art. Equipment and procedures for spray drying are reviewed by Kirk-Othmer, "Encyclopedia of Chemical Technology," Volume 7, Second Edition, John Wiley and Sons, Inc., New York, New York, 1965, pages 362–365.

Of particular interest in the process of the present invention is the isolation of 6-aminopenicillanic acid and the hydrochloride acid addition and sodium and potassium basic salts thereof from the aforesaid hydrolysis solution by spray drying at 125°–275° C. while at pH 2–8 and then extracting the phenylacetic acid or phenoxyacetic acid with an organic solvent. Also of interest in this process is the isolation of 6-aminopenicillanic acid and the aforementioned salts thereof from the aforementioned hydrolysis solution by extracting the phenylacetic acid or phenoxyacetic acid with an organic solvent and then spray drying at 125°–275° C. while at pH 2-8.

DETAILED DESCRIPTION OF THE INVENTION

As previously mentioned, the synthesis of penicillins not obtainable by direct fermentation employs acylation of 6-aminopenicillanic acid with some carboxylic acid or some derivative thereof. The most ready source of 6-aminopenicillanic acid is by hydrolysis of a penicillin, usually penicillin G or V, easily prepared by fermentation processes. Hydrolysis of these penicillins can be effected in a number of ways, the most frequently employed being the use of a bacteria or fungus having a penicillin acylase enzyme. The bacterial or fungal cells may be left whole or, alternately, the cells can be ruptured allowing the hydrolyzing enzyme to be separated from the cell fragments by centrifugation. The enzyme, freed from the cell fragments, can be employed in solution or can be fixed by physical or chemical means to a solid carrier, such as glass or an insoluble polymer.

Hydrolysis or penicillins employing chemical means has also received extensive attention, and requires chemical manipulations at the carboxamido group linking the acyl portion to the 6-aminopenicillanic acid. Reactions described in U.S. Pat. No. 3,499,909 are a classical example of penicillin hydrolysis by chemical methods.

The isolation of 6-aminopenicillanic acid, which is the core of the instant invention, is the next requisite step following the hydrolysis of a penicillin by any of the aforementioned methods. Further, in these procedures the 6-aminopenicillanic acid must be isolated from an aqueous solution.

The first preferred variation of the process of the present invention comprises initially spray drying the hydrolysis solution which is comprised mainly of 6-aminopenicillanic acid and phenylacetic acid, if the penicillin hydrolyzed is benzylpenicillin, or phenoxyacetic acid if phenoxymethylpenicillin is employed. The spray drying can be carried out over a wide range of pH's namely between 2-8. If it is preferred that 6-aminopenicillanic acid be isolated as a basic salt, then the spray drying is done at pH 6-8. If the neutral or amphoteric form of 6-aminopenicillanic acid is desired the spray drying is carried out at a pH of approximately 4 ± 0.3. Further, if an acid addition salt of 6-aminopenicillanic acid is the intended product, a pH of 2 for spray drying is used.

As one skilled in the art can readily appreciate, a choice of a pH for spray drying which falls between 2-4 ± 0.3 and 4 ± 0.3-6 will give rise to mixtures of 6-aminopenicillanic acid and an acid addition salt thereof, and 6-aminopenicillanic acid and a basic salt thereof, respectively.

In preparing basic salts of 6-aminopenicillanic acid wherein there is a need to adjust the hydrolysis solution to pH 6-8 by the addition of a base, it is desirable to employ in said base the cation from which the 6-aminopenicillanic acid base salt is to be derived. Further, when the initial penicillin employed is converted to a salt for the purpose of solubilizing it in the hydrolysis reaction, it is desirable to employ a base having the same cation as that which is to be the salt cation of the final product. It is appreciated that if a different cationic base is employed in solubilizing the penicillin as compared with that used in adjusting the pH to 8 prior to spray drying, then it is possible that more than one cationic basic salt of 6-aminopenicillanic acid will be obtained as the final product. Although any base capable of forming a stable salt with 6-aminopenicillanic acid is suitable, the preferred bases for these aforementioned procedures are potassium and sodium hydroxides.

Similarly, the anion of the acid used to provide the acid pH prior to spray drying becomes the anion of the acid addition salt of the final isolated 6-aminopenicillanic acid. The preferred acid for this purpose and hence, the preferred acid addition salt is that from hydrochloric acid, although any acid of sufficient acidic strength to form a stable salt with 6-aminopenicillanic acid can be employed with equal success.

The aqueous hydrolysis solution fed to the spray drying apparatus can vary over a wide range in the concentration of 6-aminopenicillanic acid or its salt with a preferred concentration of 2-10% (wt/vol) and is sprayed into contact with hot air at temperatures of 125°-275° C., with a preferred range of 200°-250° C.

Following the vaporization of the aqueous vehicle, the solid mixture of 6-aminopenicillanic acid or salts thereof and phenylacetic or phenoxyacetic acid, depending on the penicillin hydrolyzed, is the extracted. The solvent for the extraction can vary and is selected on the basis of the differential solubility of the phenylacetic or phenoxyacetic acids or their salts over that of the 6-aminopenicillanic acid or salt thereof in said solvent. When the spray drying is conducted at a pH of 2, the phenylacetic or phenoxyacetic acid is extracted from the 6-aminopenicillanic acid-acid addition salt, preferably the hydrochloride. For this purpose such solvents as acetone, n-butanol, ethyl acetate, chloroform, butyl acetate, and benzene are operable; the preferred solvents are ethyl acetate and n-butanol. When spray drying is conducted at pH 4 the preferred solvent for extraction of the phenylacetic or phenoxyacetic acid from the amphoteric 6-aminopenicillanic acid is methyl isopropyl ketone, and following spray drying at pH 6-8 the preferred solvent for the extraction of the phenylacetic or phenoxyacetic acid base salt from the 6-aminopenicillanic acid base salt is a mixture of 95% acetone - 5% water.

Following the removal of the acid side chain by extraction, the residual 6-aminopenicillanic acid can be further purified, if desired, or can be employed in subsequent reactions wherein it is coupled with some appropriate acid substrate, thus providing a synthetic penicillin.

The second preferred embodiment of the present process invention comprises initial extraction of the aforementioned acid side chains followed by spray drying at pH 2-8.

The hydrolysis solution, following the cleavage of the requisite penicillin G or V, is first adjusted to pH 2, preferably with hydrochloric acid, and the phenylacetic or phenoxyacetic acid extracted therefrom with a water immiscible solvent; the preferred solvents for said extraction are amyl acetate or n-butanol. Other solvents are also operable, such as ethyl acetate, chloroform, methylene chloride, benzene or toluene.

After the side chain is extracted, the remaining solution containing the 6-aminopenicillanic acid is either spray dried at pH 2, or, alternately, the pH can be adjusted to a more basic pH employing a base solution and subsequently spray dried. Said base solution selected is not critical and sodium or potassium hydroxide is preferred. When spray drying is conducted about pH 4 the 6-aminopenicillanic acid is isolated as the neutral or zwitterion form. Correspondingly, spray drying at a basic pH provides for the isolation of the basic salts of 6-aminopenicillanic acid.

The 6-aminopenicillanic acid resulting from this preferred embodiment of the instant invention, as previously mentioned, can be further purified or can be utilized in the preparation of other penicillins.

In the first preferred variation of the present process wherein the hydrolysis solution is spray dried at pH 2-8 and then the phenylacetic acid or phenoxyacetic acid extracted, it is further preferred that said solution be spray dried at pH 6-8 wherein the extraction solvent is 95% aqueous acetone, that said solution be spray dried at pH 4 wherein the extraction solvent is methyl isopropyl ketone and that said solution be spray dried at pH 2 wherein the extraction solvent is ethyl acetate.

In the second preferred variation of the present process wherein the hydrolysis solution is processed by extracting the phenylacetic acid or phenoxyacetic acid and then spray dried at pH 2-8, it is further preferred to employ n-butanol as the extraction solvent and then spray dry at pH 7, to employ amyl acetate as the extraction solvent and spray dry at pH 2 and to employ methyl isopropyl ketone as the extraction solvent and spray dry at pH 4.

The following examples are provided solely for the purpose of illustrating the invention and are not to be construed as limitations thereof, many variations of which are possible without departing from the spirit or scope thereof.

EXAMPLE 1

To a suspension of 26.7 g. of *Proteus rettgeri* ATCC 9250 cells in 1500 ml. of water is added 80 g. of sodium benzylpenicillin. The mixture is brought to pH 8.0 and stirred at 37° C. for 10 hrs., keeping the pH at 8.0 by periodic addition of 2N aqueous sodium hydroxide solution. The cell material is separated from the reaction mixture by filtration to give a clear solution. The resulting solution is spray dried to give 92.4 g. of solid consisting mainly of sodium 6-aminopenicillanic acid and sodium phenylacetate. The solid material is extracted (2 × 750 ml.) with 95% acetone to dissolve the sodium phenylacetate. The resulting solids are filtered, washed with acetone and dried to give 58.2 g. of product which is comprised of 80% sodium 6-aminopenicillanic acid by assay.

EXAMPLE 2

Sodium 6-aminopenicillanic acid is isolated in comparable yield and purity by following the procedure of Example 1 starting with 27 g. of *E. coli* ATCC 9637 and 83.6 g. of sodium benzylpenicillin.

EXAMPLE 3

Sodium 6-aminopenicillanic acid is isolated in comparable yield and purity by following the procedure of Example 1 starting with 27 g. of *Aspergillus flavus* Link ATCC 13608 cells and 84.0 g. of sodium phenoxymethylpenicillin.

EXAMPLE 4

*Proteus rettgeri* ATCC 9250 cells are disrupted in an ultrasonic bath, the mixture centrifuged, and the clear supernatant dialyzed and lyophilized to give crude penicillin acylase. To a solution of 2.0 g. of the acylase enzyme in 150 ml. of water is added 8.0 g. of potassium benzylpenicillin. The resulting solution is stirred at 37° C. for 10-20 hrs. with control of pH at 8.0 by careful addition of 2N aqueous potassium hydroxide solution. The solution is transferred to an ultrafiltration unit and allowed to pass through a semipermeable membrane under nitrogen pressure. The resulting, essentially protein free solution is spray dried as in Example 1 and the resulting solids freed of potassium phenylacetate by extraction with 95% acetone leaving the desired crude potassium-6-aminopenicillanate in good yield.

EXAMPLE 5

The procedure of Example 4 is repeated, starting with 2.0 g. of penicillin acylase enzyme from *E. coli* ATCC 9637 and 8.4 g. of potassium benzylpenicillin to provide potassium 6-aminopenicillanate.

EXAMPLE 6

The procedure of Example 4 is again repeated, starting with cells from *Aspergillus flavus* Link ATCC 13608 and potassium phenoxymethylpenicillin, to provide the desired product.

EXAMPLE 7

Penicillin acylase from *Proteus rettgeri* ATCC 9250 is immobilized on porous glass according to the procedure given in U.S. Pat. No. 3,556,945. This material is added to a 4% potassium benzylpenicillin solution in amounts sufficient to complete the hydrolytic reaction is 12-18 hours at 37° C. and pH 8.0. The reaction mixture is filtered to give a clear solution and a solid enzyme material which can be reused. The clear solution at pH 8.0 is spray dried and the potassium phenylacetate extracted from the solids employing 95% acetone, leaving potassium 6-aminopenicillanate.

In a similar manner acylase from *E. coli* ATCC 9637 can be substituted for that from *Proteus rettgeri* ATCC 9250 with similar results.

EXAMPLE 8

Results similar to those of Example 7 are obtained when the procedure is repeated employing penicillin acylase from *Aspergillus flavus* Link ATCC 13608 and potassium phenoxymethylpenicillin.

EXAMPLE 9

To a mixture of 45 g. of potassium benzylpenicillin in 200 ml. of methylene chloride is added 32 ml. of N,N-dimethylaniline. To this stirred suspension is added dropwise 12 ml. of dimethyl dichlorosilane over a 30 minute period keeping the temperature below 30° C. The mixture is cooled to −50° C. and 27 g. of phosphorus pentachloride is added all at once, and the mixture is stirred at −40° C. for 2 hours and then cooled to −65° C. To this mixture is added 6.4 ml. of N,N-dimethyl aniline and 200 ml. of n-butanol, keeping the temperature below −40° C. The mixture is stirred vigorously at −40° C. for 3 hours, then allowed to warm to room temperature during which time 250 ml. of distilled water is added with continued stirring. The phenylacetic acid is extracted in the n-butanol layer, and the aqueous phase adjusted to pH 8.0 with a 2N aqueous potassium hydroxide solution and spray dried. The solids, 47.4 g., are comprised of 75% potassium 6-aminopenicillanate.

Similar results are obtained when potassium phenoxymethylpenicillin is substituted for potassium benzylpenicillin.

EXAMPLE 10

A 5% solution of potassium benzylpenicillin is treated as in Example 5 to generate a clear, filtered solution at pH 8.0. The solution is adjusted to pH 4.0 with 6N hydrochloric acid and spray dried. The resulting light yellow solid is slurried several times in methyl isopropyl ketone to remove the phenylacetic acid, and is then filtered and dried to provide a good yield of 6-aminopenicillanic acid.

EXAMPLE 11

In a manner similar to Example 5, 75 g. of porous glass on which has been immobilized penicillin acylase from *A. flavus* Link ATCC 13608 is added to 1 l. of a 3% aqueous solution of potassium phenoxymethylpenicillin and the mixture gently agitated for 18 hrs. at 37° C. and pH 8.0. The clear filtered solution is adjusted to pH 2 with 6N hydrochloric acid and spray dried to give a slightly yellow solid. The phenoxyacetic acid is extracted from the spray dried solids using ethyl acetate, and the remaining solids are filtered to provide crude 6-aminopenicillanic acid hydrochloride.

EXAMPLE 12

A 7% aqueous solution (1500 ml.) of potassium benzylpenicillin is treated with 300 g. of porous glass on which is immobilized penicillin acylase from *Proteus rettgeri* ATCC 9250. After the resulting mixture has been gently stirred for 20 hrs. at 37° C. and pH 8.0, the fixed enzyme is recovered by filtration and the resulting filtrate adjusted to pH 2 with 6N hydrochloric acid. The phenylacetic acid is extracted with amyl acetate and the aqueous phase is spray dried to give solid 6-aminopenicillanic acid hyrochloride.

EXAMPLE 13

To 1000 ml. of a 5% aqueous solution of potassium phenoxymethylpenicillin is added 120 g. of porous glass on which is immobilized penicillin acylase from *Aspergillus flavus* Link ATCC 13608. The mixture, after being gently agitated for 18 hrs. at 37° C. and pH 8.0, is filtered and the filtrate adjusted to pH 2 with 6N hydrochloric acid. The phenoxyacetic acid is subsequently extracted with n-butanol, and the aqueous layer adjusted to pH 4.0 with sodium hydroxide solution and spray dried to give crude 6-aminopenicillanic acid.

EXAMPLE 14

To a solution of 2.0 g. of penicillin acylase in 150 ml. of water, prepared as in Example 3, is added 75 g. of potassium benzylpenicillin. The reaction mixture is stirred for 18 hrs. at 37° C. while the pH is maintained at 8.0 by periodic addition of 2N aqueous potassium hydroxide. The solution is passed through a semipermeable membrane under nitrogen pressure and the filtrate adjusted tp pH 2 with 6N hydrochloric acid. The phenylacetic acid is extracted with methyl isopropyl ketone and the aqueous layer adjust to pH 7 with 4N potassium hydroxide and spray dried. The spray dried solids, which are comprised mainly of crude potassium 6-aminopenicillanate, are subsequently collected.

EXAMPLE 15

A 2% solution of potassium phenoxymethylpenicillin is reacted according to the procedure of Example 8, and the filtered reaction mixture at pH 8.0 is spray dried. The resulting off-white solid is extracted with cold methanol to remove potassium phenoxyacetate. The solids are filtered to provide crude potassium 6-aminopenicillanate in good yield.

EXAMPLE 16

The procedure of Example 7 is followed, starting with a 4% aqueous solution of sodium benzylpenicillin. After filtering the reaction mixture the filtrate is adjusted to pH 4.0 with 6N hydrochloric acid and subsequently spray dried. The white, spray dried solids are extracted with methyl isopropyl ketone, leaving, after filtration, the desired product, 6-aminopenicillanic acid.

EXAMPLE 17

A 4% solution of sodium phenoxymethylpenicillin is treated as in Example 8 to generate a clear, filtered solution. The solution is adjusted to pH 4.0 with 6N hydrochloric acid and spray dried to give a white solid. The solid is slurried several times in methyl isopropyl ketone, filtered and dried to give a good yield of 6-aminopenicillanic acid.

EXAMPLE 18

A 3% solution of potassium phenoxymethylpenicillin is treated as in Example 8 to generate a clear, filtered solution. The solution is adjusted to pH 2.0 with 6N hydrochloric acid and spray dried to give a light yellow solid. The solid, which is slurried several times in butyl acetate to dissolve the phenoxyacetic acid, is filtered and dried to give a good yield of 6-aminopenicillanic acid hydrochloride.

EXAMPLE 19

A 4% solution of potassium benzylpenicillin is treated as in Example 4 to generate a clear solution. The solution is adjusted to pH 2.0 with 6N hydrochloric acid and extracted twice with ethyl acetate. The resulting aqueous layer is spray dried at pH 2.2 to give a good yield of 6-aminopenicillanic acid hydrochloride.

EXAMPLE 20

A 4% solution of sodium benzylpenicillin is treated as in Example 7, using a 2N sodium hydroxide solution to keep the pH constant at 8.0, to generate a clear, filtered solution. The solution is adjusted to pH 2.1 with 6N hydrochloric acid and extracted several times with methyl isopropyl ketone. The resulting aqueous layer is adjusted to pH 7.3 with 4N sodium hydroxide and spray dried to give a good yield of sodium 6-aminopenicillanate.

EXAMPLE 21

A 5% solution of sodium phenoxymethylpenicillin is treated as in Example 8, to generate a clear, filtered solution. The solution is adjusted to pH 2 with 6N hydrochloric acid and extracted with butanol. The aqueous phase is separated, adjusted to pH 4 with sodium hydroxide solution and spray dried to give crude 6-aminopenicillanic acid.

What is claimed is:

1. A process for isolating 6-aminopenicillanic acid, its sodium salt, its potassium salt or its hydrochloride acid addition salt from an aqueous solution containing 6-aminopenicillanic acid, its sodium salt, its potassium salt or its hydrochloride acid addition salt at a concentration of 2–10 weight percent per unit volume and either phenylacetic acid or phenoxyacetic acid, which comprises the steps of spray drying said hydrolysis solution at 125°–275°C. while at pH 2–8 and extracting the phenylacetic acid or phenoxyacetic acid with an organic solvent.

2. The process of claim 1 which comprises spray drying said aqueous solution at 125°–275° C. at pH 2–8 and then extracting the phenylacetic acid or phenoxyacetic acid with an organic solvent.

3. The process of claim 1 which comprises extracting the phenylacetic acid or phenoxyacetic acid with an organic solvent and then spray drying said aqueous solution at 125°–275° C. while at pH 2–8.

4. The process of claim 2 wherein said solution is spray dried at pH 6–8.

5. The process of claim 4 wherein the phenylacetic acid or phenoxyacetic acid is extracted with 95% aqueous acetone.

6. The process of claim 2 wherein said solution is spray dried at pH 4.

7. The process of claim 6 wherein the phenylacetic acid or phenoxyacetic acid is extracted with methyl isopropyl ketone.

8. The process of claim 2 wherein said solution is spray dried at pH 2.

9. The process of claim 8 wherein the phenylacetic acid or phenoxyacetic acid is extracted with ethyl acetate.

10. The process of claim 3 wherein the phenylacetic acid or phenoxyacetic acid is extracted with n-butanol.

11. The process of claim 10 wherein the spray drying is at pH 7.

12. The process of claim 3 wherein the phenylacetic or phenoxyacetic acid is extracted with amyl acetate.

13. The process of claim 12 wherein the spray drying is at pH 2.

14. The process of claim 3 wherein the phenylacetic acid or phenoxyacetic acid is extracted with methyl isopropyl ketone.

15. The process of claim 14 wherein the spray drying is at pH 4.

* * * * *